United States Patent [19]
Sakata

[11] Patent Number: 6,072,925
[45] Date of Patent: Jun. 6, 2000

[54] OPTICAL INTEGRATED NODES, AND OPTICAL COMMUNICATION SYSTEMS AND NETWORKS USING THE OPTICAL INTEGRATED NODES

[75] Inventor: Hajime Sakata, Atsugi, Japan

[73] Assignee: Canon Kabushiki Kaisha, Tokyo, Japan

[21] Appl. No.: 08/515,704

[22] Filed: Aug. 16, 1995

Related U.S. Application Data

[63] Continuation of application No. 07/984,380, Dec. 2, 1992, abandoned.

[30] Foreign Application Priority Data

Dec. 5, 1991 [JP] Japan ................................... 3-348687

[51] Int. Cl.$^7$ .............................. G02B 6/12; H01S 3/19
[52] U.S. Cl. .................................. 385/24; 385/14; 385/37; 385/42; 385/50; 385/131; 372/50; 359/124; 359/127
[58] Field of Search ................................ 385/24, 14, 37, 385/39, 41, 42, 50, 88, 89, 49, 129, 131; 372/50, 96; 359/124, 127, 130, 173

[56] References Cited

U.S. PATENT DOCUMENTS

| | | | |
|---|---|---|---|
| 4,146,297 | 3/1979 | Alferness et al. | 385/41 |
| 4,798,429 | 1/1989 | Djupsjöbacka | 385/24 |
| 4,831,631 | 5/1989 | Haeussler et al. | 385/14 X |
| 5,002,369 | 3/1991 | Sakata | 359/241 |
| 5,064,263 | 11/1991 | Stein | 385/14 |
| 5,109,444 | 4/1992 | Handa et al. | 385/14 |
| 5,144,637 | 9/1992 | Koch et al. | 385/14 X |
| 5,148,507 | 9/1992 | Tanisawa | 385/14 X |
| 5,253,314 | 10/1993 | Alferness et al. | 385/14 X |
| 5,333,231 | 7/1994 | Fukuda et al. | 385/14 X |

FOREIGN PATENT DOCUMENTS 0238082 9/1987 European Pat. Off. .
0262409 4/1988 European Pat. Off. .

OTHER PUBLICATIONS

"Monolithic Integration of ARROW–type Demultiplexer and Photodetector" by Y. Kokubun et al.; Fourteenth European Conference on Optical Communication (ECOC 88) vol. 1 Sep. 15, 1988 Brighton, U.K. pp. 231–234.

*Primary Examiner*—Hemang Sanghavi
*Attorney, Agent, or Firm*—Fitzpatrick, Cella, Harper & Scinto

[57] ABSTRACT

An integrated optical node includes a main waveguide, a sub-waveguide, a fixed-wavelength type optical coupler and a tunable type optical coupler. On the sub-waveguide, an optical receiver may be formed to detect light guided from the main waveguide to the sub-waveguide by the optical coupler and/or a laser may be formed to emit light to be guided from the sub-waveguide to the main waveguide by the optical coupler. The elements of the optical node are arranged on a common semiconductor substrate so that the optical node can be reduced in size.

70 Claims, 8 Drawing Sheets

OPTICAL INTEGRATED NODES, AND OPTICAL COMMUNICATION SYSTEMS AND NETWORKS USING THE OPTICAL INTEGRATED NODES

This application is a continuation of application Ser. No. 07/984,380 filed Dec. 2, 1992, now abandoned.

BACKGROUND OF THE INVENTION

1. Field of the Invention

The present invention relates to optical nodes and, more particularly, to an integrated optical node that includes a unit for selecting a signal light of an arbitrary wavelength and at least one of a unit for transmitting a signal light and a unit for receiving a signal light of a selected wavelength, and to an optical communication network using such an optical node.

2. Related Background Art

In an optical communication network having a system of a demand-assignment type wavelength division multiplexing access (DA-WDMA) using multiplexed wavelengths, the network generally requires transmitting or receiving a wavelength (the term "wavelength" herein also refers to an optical signal having such a wavelength) carrying an access-control signal and a wavelength carrying a data signal simultaneously. Further, it is necessary to select an arbitrary wavelength for transmission and reception of wavelength division multiplexed data signals. However, to ensure that optical nodes in the optical communication network have such functions, it is necessary to arrange several separate devices in the optical node.

Figure 1A:
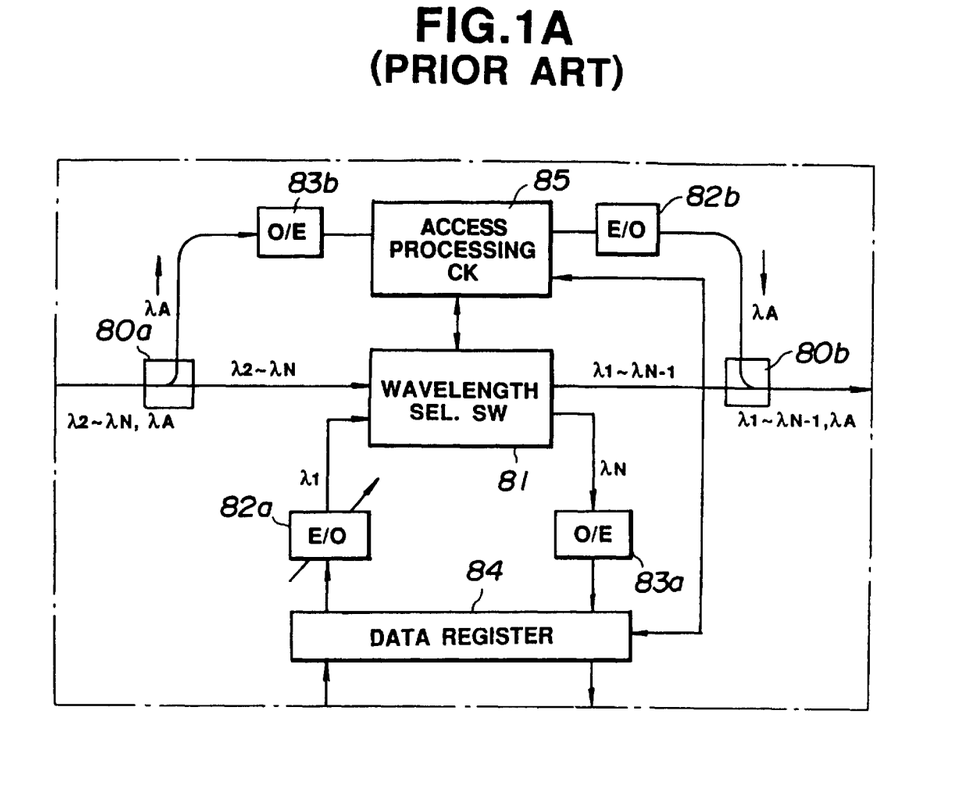
FIG. 1A is a schematic representation of a prior art optical node.
Figure 1B:
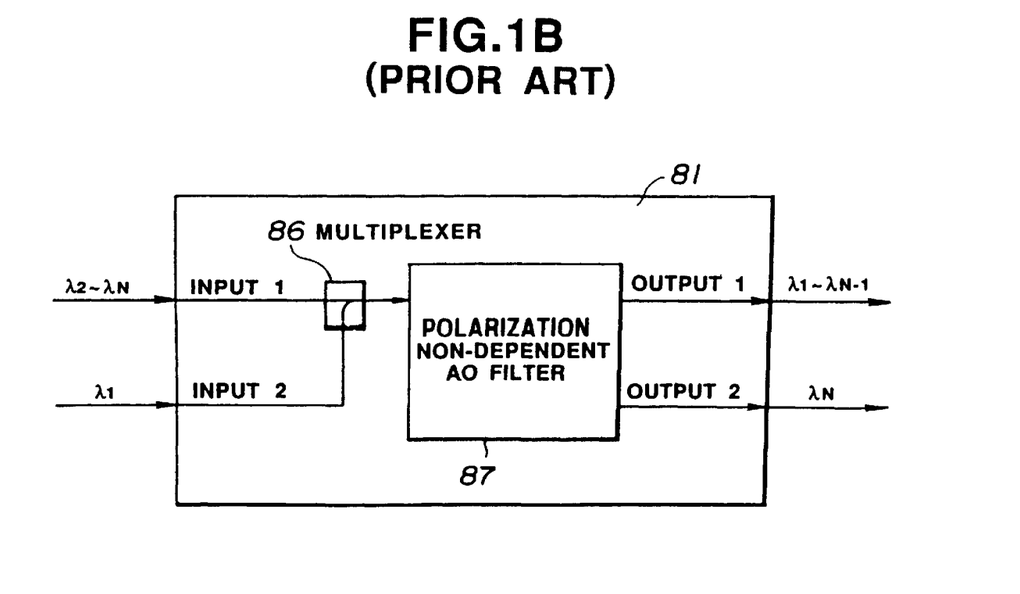
FIG. 1B is a schematic representation of a wavelength-selection switching device integrated in the optical node shown in FIG. 1A.

An example of such a prior art node will be described hereinafter. Referring now to FIGS. 1A and 1B which schematically depict one known example of prior art optical nodes described in "SB-6-6 distributed in Vernal National Conference of Japanese Academy of Electronics Information Communications, 1991", the optical node comprises the following discrete devices: a device 80a for separating a wavelength $\lambda_A$ carrying an access-control signal from an input light composed of wavelengths $\lambda_A$ and $\lambda_2$–$\lambda_N$, a device 80b for coupling or multiplexing the wavelength $\lambda_A$ with wavelengths $\lambda_1$–$\lambda_{N-1}$ of an output light, and a switching device 81 which couples a wavelength $\lambda_1$ with the separated wavelengths $\lambda_2$–$\lambda_N$ and selects an arbitrary wavelength $\lambda_N$ from among the wavelengths $\lambda_1$–$\lambda_{N-1}$. As shown in FIG. 1B, the switching device 81 includes an optical coupler or multiplexer 86 and an acousto-optic filter (AO filter) 87 which has no polarization dependency.

For the reason set forth above, following problems have arisen with the prior art optical node:

(a). expansion of optical node size, (b). optical loss at optical coupling elements, and (c). optical arrangement complexity.

Moreover, these problems have become more serious since the optical node requires additional discrete devices such as electro-optical converters (E/O) 82a and 82b for converting an electric signal to an optical signal, opto-electric converters (O/E) 83a and 83b for converting an optical signal to an electric signal. Integrated into the optical node are a data register 84 which stores input and output data and an access processing circuit 85 for processing an access-control. These elements are also needed in different types of optical nodes.

SUMMARY OF THE INVENTION

Accordingly, it is an object of the present invention to provide an optical node and an optical communication system and network using the optical node, which may transmit and/or receive an access-control signal and wavelength division multiplexed data signals simultaneously and may select an arbitrary wavelength from among division-multiplexed wavelengths carrying data signals.

The invention is directed to an optical node in which a main waveguide and at least one sub-waveguide are formed on a substrate. A predetermined wavelength optical signal is coupled between the main waveguide and the sub-waveguide by a first optical coupler and other wavelength signals are coupled between the main waveguide and the sub-waveguide by a second optical coupler.

In carrying out the present invention in one preferred mode, an integrated optical node includes a main waveguide, a sub-waveguide, a fixed-wavelength type optical coupler, a tunable type optical coupler and a substrate. The fixed-wavelength type optical coupler performs optical coupling between the main waveguide and the sub-waveguide at a predetermined wavelength, and the tunable type optical coupler performs optical coupling between the main waveguide and the sub-waveguide at an arbitrarily tuned wavelength.

A optical receiver for receiving light guided from the main waveguide to the sub-waveguide by the optical coupler and/or a laser for emitting light to be guided from the sub-waveguide to the main waveguide by the optical coupler may be formed on the sub-waveguide.

In carrying out the present invention in another preferred mode, an optical communications network includes a light transmission line, a plurality of terminals and a plurality of optical nodes for respectively connecting corresponding terminals to the transmission line. At least one of the optical nodes includes the above-described optical node.

According to the present invention, the integrated optical node can be reduced in size since all elements are formed on a common substrate. Utilizing this small optical node in an optical communication network which adopts, for example, a DA-WDMA method using multiplexed wavelengths, it is possible to reduce optical loss in a transmission line and to improve the reliability of the optical communication network.

BRIEF DESCRIPTION OF THE DRAWINGS

Further objects and advantages of the present invention will be apparent from the following description, reference being made to the accompanying drawings wherein preferred embodiments of the present invention are clearly shown.

In the drawing.

DESCRIPTION OF THE PREFERRED EMBODIMENT

First Embodiment Of Optical Node

Figure 2:
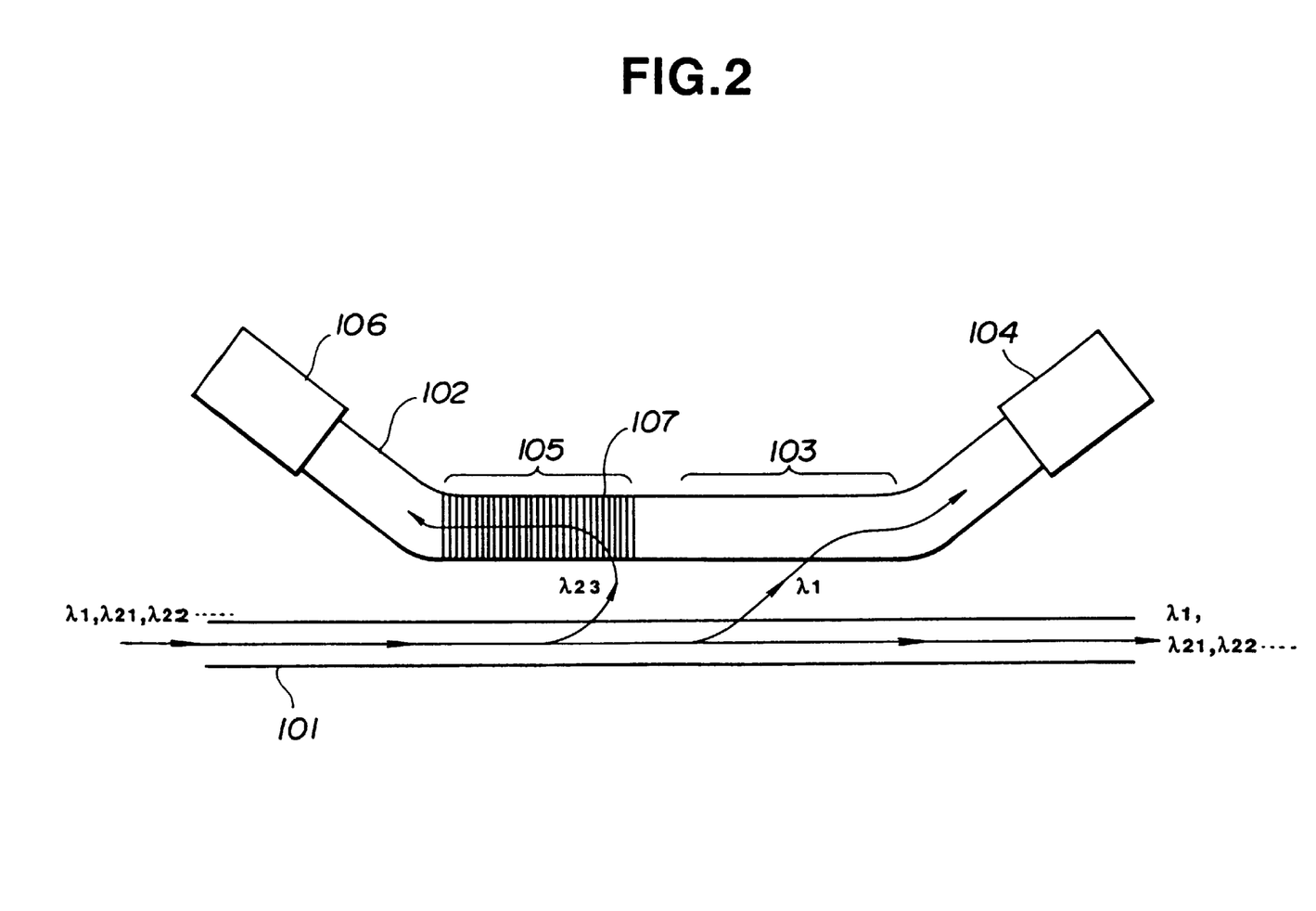
FIG. 2 is a schematic representation of a first embodiment of an optical node illustrative of the present invention.

FIG. 2 schematically illustrates a principle or concept of an optical node of the first embodiment of the present invention. In FIG. 2, the numeral 101 represents a main waveguide connected directly to a light transmission line (not shown) for transmitting an access-control signal and data signals therethrough; the numeral 102 indicates a sub-waveguide for coupling light so as to receive the access-control signal and data signals from, or transmit them to the light transmission line through the main waveguide 101; the numeral 103 designates a wavelength-fixed type optical coupler tuned stably to only a wavelength $\lambda_1$ of the access-control signal; the numeral 104 shows an optical receiver for detecting the access-control signal conducted from the main waveguide 101 through the optical coupler 103; the numeral 105 represents a tunable type optical coupler which can select an arbitrary wavelength (an example thereof is $\lambda_{23}$ shown in FIG. 2) from among wavelength division multiplexed wavelengths ($\lambda_{21}, \lambda_{22}, \ldots$) for carrying data; the numeral 106 indicates an optical receiver for detecting light of the wavelengths $\lambda_{23}$ which is conducted from the main waveguide 101 and is selected by the optical coupler 105.

The main waveguide 101 and the sub-waveguide 102 are partly in parallel, but (differ in thickness and width. Therefore, they form two sets of asymmetrical directional couplers. In the optical coupler 103, light coupling in the forward direction of the multiplexed signals, which travel in the main waveguide, occurs at only the preset wavelength $\lambda_1$. That is to say, light coupling occurs between waveguides 101 and 103 due to the coincidence of a propagation constant therebetween with regard to the guided light in a certain specific bandwidth, and then only the light at the wavelength $\lambda_1$ is selected. Thus, optical power can be transferred from the main waveguide 101 to the sub-waveguide 103.

In the optical coupler 105, a grating 107 is formed for phase matching on the asymmetrical directional coupler. The grating 107 exhibits various indexes of refraction corresponding to a voltage applied to the grating 107, or a current injected thereinto. Thus the wavelength $\lambda_{2i}$ to be selected by the optical coupler 105 is controlled according to the variation of refractive index. Here, as seen in FIG. 2, when using the grating 107 having a fine periodicity, the direction of light coupling is backward or reversed and the wavelength selected by the optical coupler 105 is given by the following equation:

$$\beta_e(\lambda_{2i})+\beta_o(\lambda_{2i})=2\pi\Lambda \quad (1)$$

where $\beta_e$ is the propagation constant of a even mode light and $\beta_o$ is the propagation constant of an odd mode light. The $\beta_e$ and $\beta_o$ have the spectral spike of intensity, respectively, at the main waveguide 101 and the sub-waveguide 102, and $\Lambda$ represents the pitch of the grating 107.

Second Embodiment Of Optical Node

Figure 3:
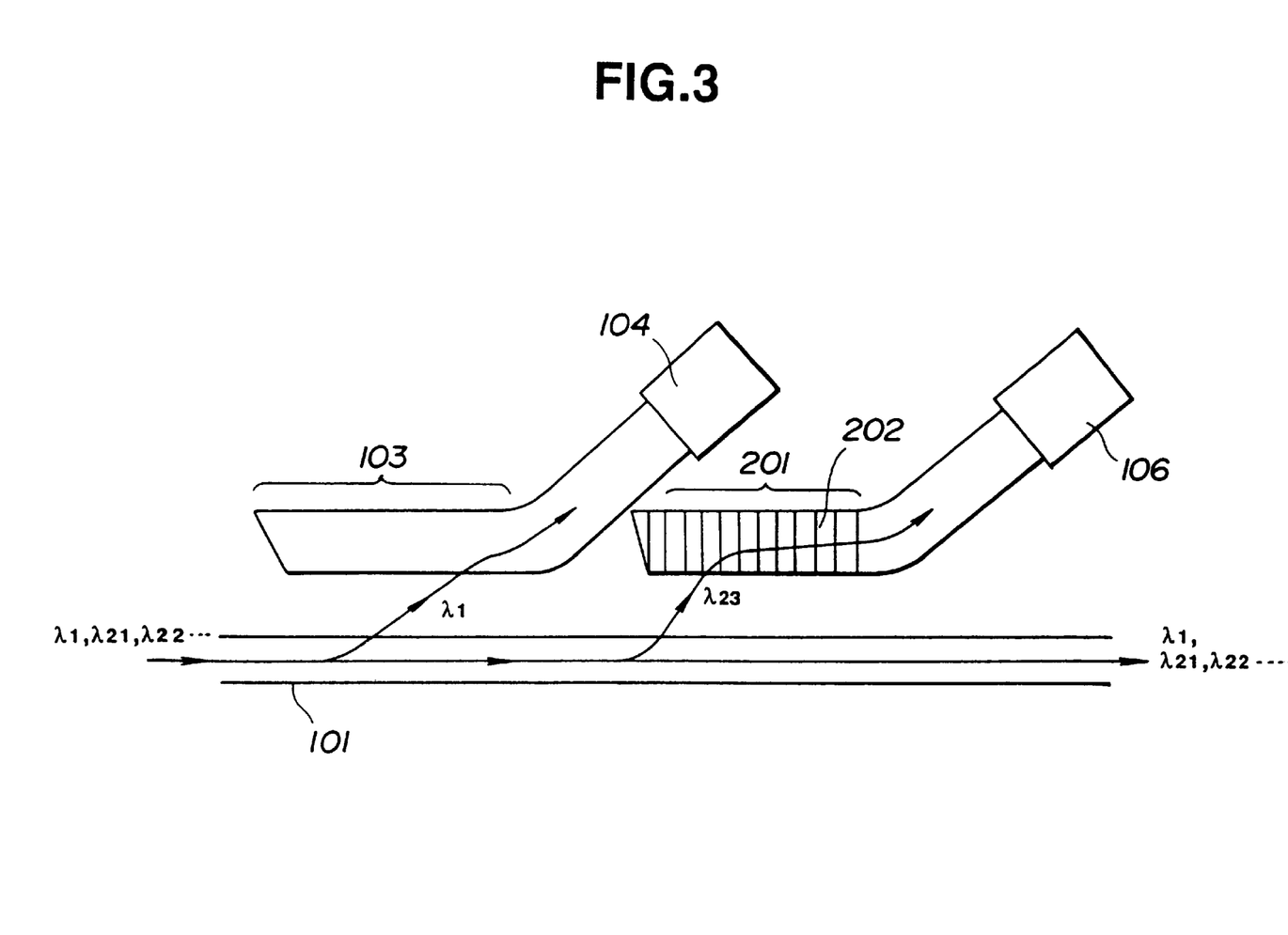
FIG. 3 is a schematic representation of a second embodiment of an optical node illustrative of the present invention.

FIG. 3 shows a principle or concept of an optical node in the second embodiment of the present invention.

As shown in FIG. 3, when using a grating 202 which has a coarse periodicity, the direction of light coupling is forward and the wavelength selected by an optical coupler 201 is given by the following equation:

$$\beta_e(\lambda_{2i})-\beta_o(\lambda_{2i})=2\pi/\Lambda \quad (2).$$

In the case of a forward-direction coupling, the optical receiver 106 is positioned at the forward end of the optical coupler 201. This embodiment is similar to the first, except that the optical receiver 106 is positioned at the forward end of the optical coupler 201 since the direction of light coupling is forward. The same reference numerals in FIG. 3 as those in FIG. 2 respectively designate the same elements as the elements in FIG. 2.

Third Embodiment Of Optical Node

In the above embodiments, the optical receivers 104 and 106 are integrated in an optical node, but lasers also may be integrated in the node instead of, or in addition to the receivers 104 and 106. In this way, the node can transmit not only an access-control signal but data information carried with an arbitrary wavelength simultaneously.

Figure 4:
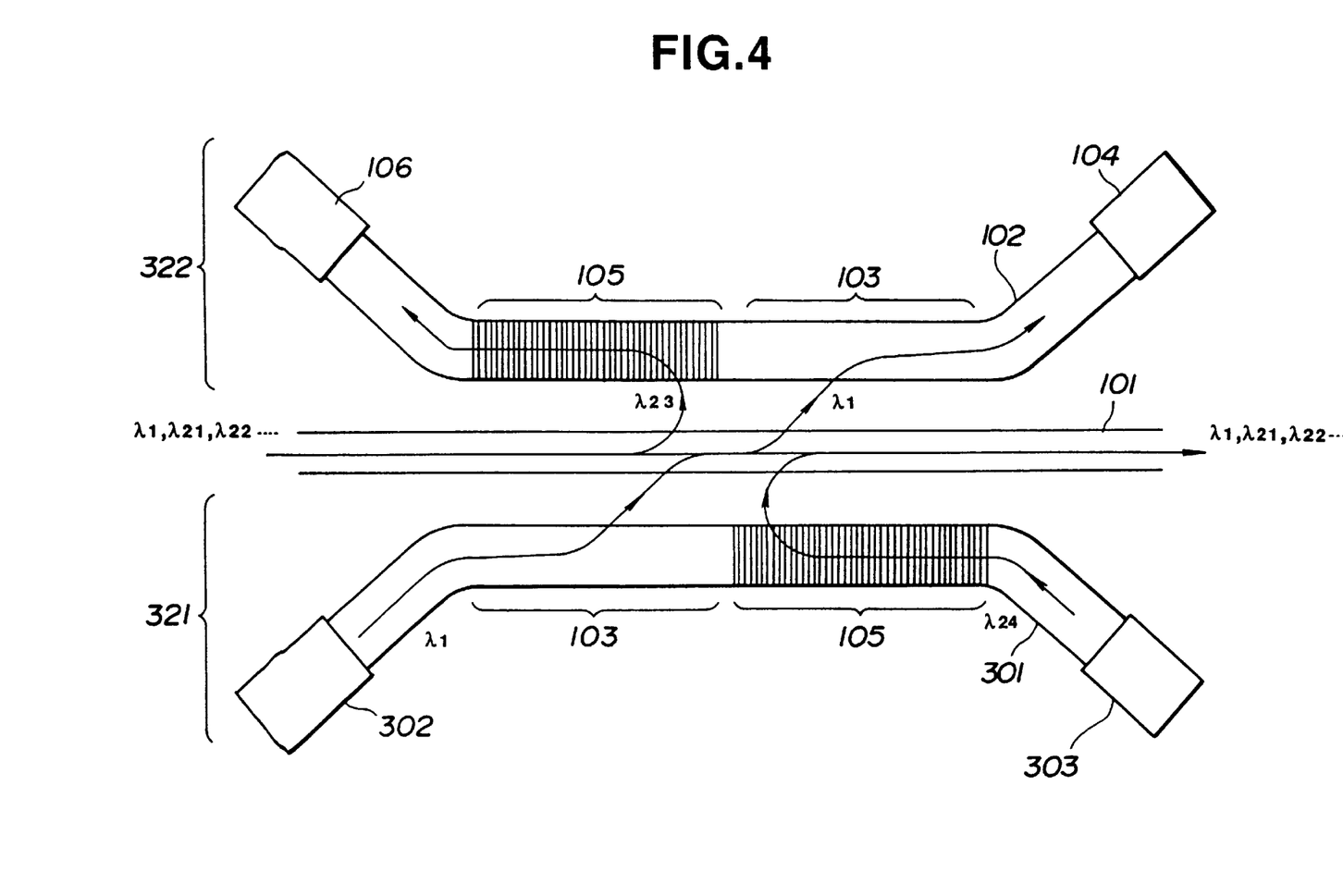
FIG. 4 is a schematic representation of a third embodiment of an optical node illustrative of the present invention.

Referring now to FIG. 4, this figure depicts a principle or concept of an optical node of the third embodiment of the present invention. The sub-waveguide 301 for transmission with two lasers 302 and 303 and another sub-waveguide 102 for receiving with two receivers 104 and 106 are integrated in FIG. 4 so that the optical node provides both transmitter and receiver functions. As shown in FIG. 4, the lasers 302 and 303, formed in a light transmitting part 321, are disposed along one side of the transmission line 101 while the receivers 104 and 106, formed in a light receiving part 322, are disposed along an opposite side of the transmission line 101. In this case, the laser 302 oscillates at a fixed wavelength $\lambda_1$ for transmitting the access-control signal and the laser 303 can vary its wavelength of oscillation (an example of the laser 302 operating at $\lambda_{24}$ is shown in FIG. 4) for transmitting the data signal. The optical couplers 103 and the tunable optical couplers 105, respectively disposed at both the transmitting part 321 and the receiving part 322, function in the same manner as those in FIG. 2. The other operations, structure, etc., of this optical node are similar to those of the first embodiment shown in FIG. 2.

First Embodiment Of Optical Communication Network

Figure 5:
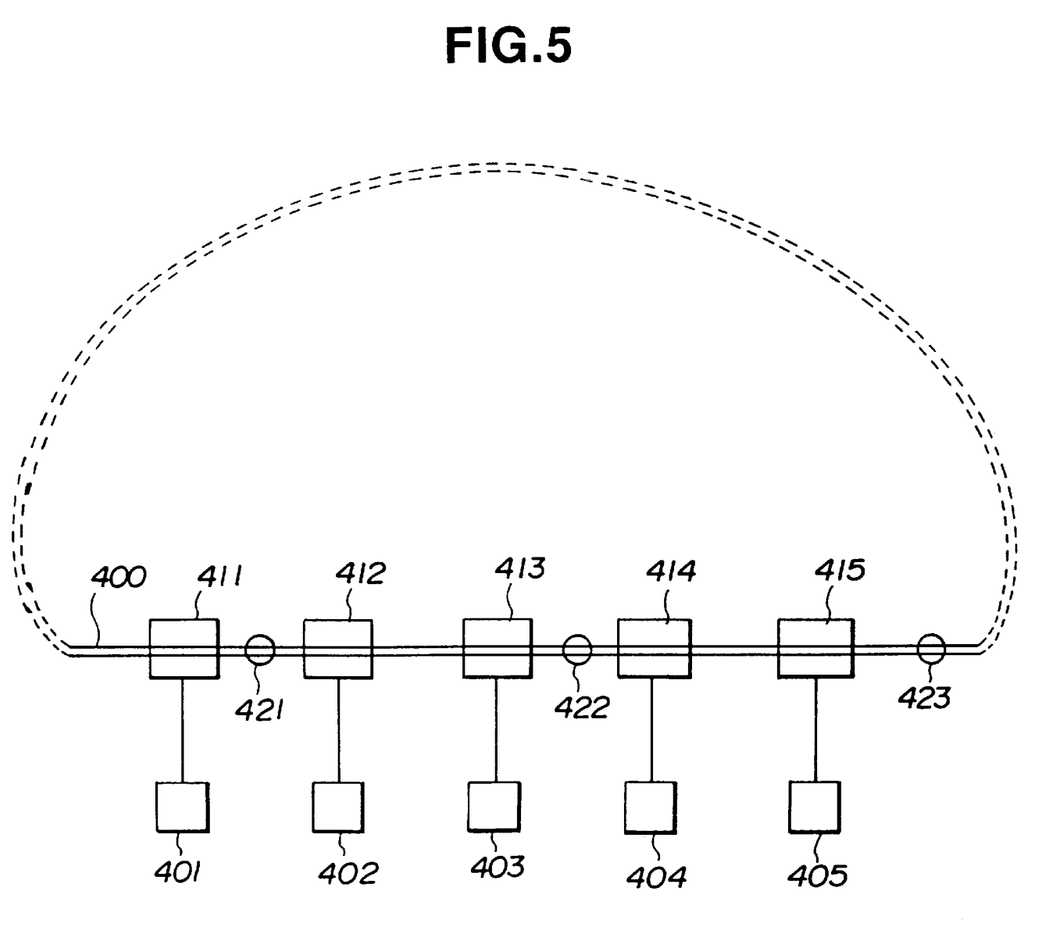
FIG. 5 is a schematic diagram of an embodiment of a loop type optical communication network including the optical node shown in FIG. 4.

Referring to FIG. 5, this figure schematically illustrates a first embodiment of a loop-type network for optical communication utilizing the above-mentioned optical node (shown in FIG. 4).

In FIG. 5, the numeral 400 is a light transmission line such as an optical fiber, the numerals 401–405 are terminals communicating with each other through the line 400. The numerals 411–415 are optical nodes connected to the light transmission line 400. The numerals 421–423 are optical repeaters for amplifying and transmitting light signals traveling through the line 400. Each of nodes 411–415 converts an electrical signal, which is input from the corresponding one of terminals 401–405, to a light signal and outputs the light signal into the line 400, while each of the optical nodes 411–415 converts a light signal, which is input from the line 400, to an electric signal and outputs the electric signal into the corresponding one of terminals 401–405. Furthermore, the optical nodes 411–415 control the communication on the network independently to avoid collisions that might occur, for example, when two or more nodes attempt to transmit signals using the same wavelength at the same time.

Assume, for example, that there is a communication between terminals 402 and 404 for the purpose of description concerning the operation of this network. When the terminal 402 sends its electric signal, the light transmitting part 321 in the optical node 412 corresponding to the terminal 402 controls the communication preferably using a predetermined multiplexing method, such as time-division multiplexing, wavelength division multiplexing or CSMA/

CD (Carrier Sense Multiple Access with Collision Detection), to avoid collisions on the line 400 between the wavelength carrying data from the terminal 402 and the wavelengths carrying data from the other terminals. Then the light transmitting part 321 converts an electric signal, input from the corresponding terminal 402, to an optical signal. Thus, the light signal is sent from the optical node 412 to the transmission line 400. In traveling through the line 400 to the optical node 414, power of the light signal branches off in the passing optical node 413. However, the optical repeater 422 amplifies the attenuated light signal and hence the intensity of the power is recovered.

When the light signal reaches the destination optical node 414, the light receiving part 322 separates the wavelength carrying the access-control signal from the other light signals and converts this access-control signal to an electric signal via the fixed-wavelength of optical coupler 103 and the optical receiver 104. After identifying this electric signal as a destination address to this terminal 404, the optical node 414 sends a data signal to this terminal 404 through the tunable type optical coupler 105 and the receiver 106.

This embodiment is described as a network in which the above-mentioned optical amplifiers (repeaters 421–423) are disposed on the transmission line 400. However, it is not necessary to utilize these amplifiers when the light transmitting part 321 in each node can output a light signal having enough power to travel to the most distant node. Alternatively, these amplifiers can be omitted provided that the receiving part 322 in each node is sufficiently sensitive to detect a reduced signal.

When attenuation of the light signal in passing optical nodes is within an acceptable level, optical repeaters 421–423 may be omitted from the transmission line 400. For that reason, it is not essential to use all the optical amplifiers shown in FIG. 5 and hence it is possible to construct the optical communication system having the above-mentioned advantages, by using at least one of the amplifiers.

In the optical communications system shown in FIG. 5, the repeaters 421–423 are discrete devices and are positioned on the light transmission line 400 independently of the optical nodes 411–415, but this system can be constructed using the optical node having a built-in optical repeater. Furthermore, this embodiment is described as an optical communication system that includes a single light transmission line, but it is readily understood that this system can achieve the previously-mentioned advantages also in the case of bi-directional or multiplexed transmission which utilizes a plurality of optical fibers, by positioning the optical nodes on each optical fiber.

Fourth Embodiment Of Optical Node

The following exposition deals with the fourth embodiment of an optical node according to the present invention. Each of the optical couplers in the above-mentioned embodiments are of a lateral or horizontal type in which the main waveguide and the sub-waveguide are arranged horizontally in a plane, but an optical coupler of this embodiment may be of a vertical type wherein waveguides are vertically arranged in different planes.

Figure 6:
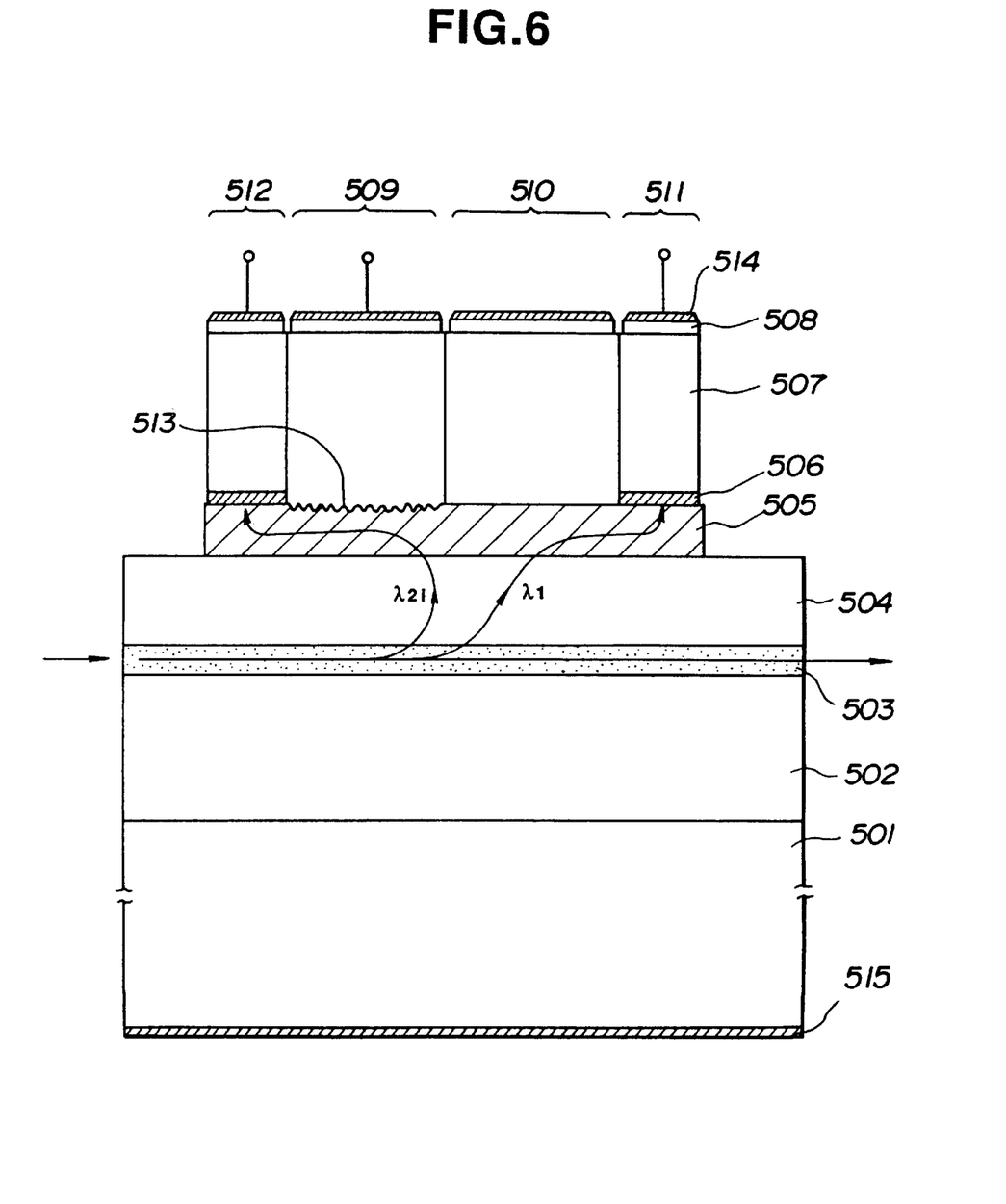
FIG. 6 is a cross-sectional view of a fourth embodiment of an optical node illustrative of the present invention.

Referring to FIG. 6, this figure shows a cross-section of an optical node of the fourth embodiment. First, a multi-layer structure is grown on an n$^+$-type GaAs substrate 501 in the following order: an n-type GaAs buffer layer (not shown), an n-type $Al_{0.5}Ga_{0.5}As$ cladding layer 502, an n-type GaAs (well layer)/$Al_{0.5}Ga_{0.5}As$ (barrier layer) multiple quantum well structure (MQW) 503 which is a main or lower waveguide 503, an n-type $Al_{0.5}Ga_{0.5}As$ cladding layer 504 between waveguides, an undoped GaAs/$Al_{0.3}Ga_{0.7}As$ MQW upper waveguide or sub-waveguide 505, an undoped GaAs photodetector layer 506, a p-type $Al_{0.5}Ga_{0.5}As$ cladding layer 507 and a p$^+$-type GaAs cap layer 508.

Secondly, optical couplers 509 and 510 are formed in accordance with following steps. The first step is to eliminate or remove the undoped GaAs photodetector layer 506, the p-type $Al_{0.5}Ga_{0.5}As$ cladding layer 507 and the p$^+$-type GaAs cap layer 508 by means of reactive ion beam etching so that the top surface of the upper waveguide 505 is partially exposed. The second step is to form a grating 513 having a periodicity of 7.6 $\mu$m on a portion of the exposed top surface of the upper waveguide 505 by means of lithography, using a photomask. The third step is to re-grow the cladding layer 507 and the cap layer 508 again on this exposed portion.

Thirdly, to attain a lateral confinement, a buried heterostructure (BH structure) is fabricated by subsequent steps. Both side-surfaces of the above multi-layer structure are etched. The depth of etching extends from the cap layer 508 to the substrate 501. Next, the side-surfaces are buried respectively with high resistance material (not shown) consisting of $Al_{0.5}Ga_{0.5}As$.

Further, as seen in FIG. 6, both ends of the upper waveguide (sub-waveguide) 505 are removed, respectively, by a width of 100 $\mu$m so that it becomes possible for light to be input from and output to the light transmission line through only the lower waveguide (main waveguide) 503.

Finally, an electrode 514 consisting of Cr/Au is formed onto the top surface of the cap layer 508, another electrode 515 consisting of AuGe/Au is formed onto the bottom surface of the substrate 501 and receivers 511 and 512 are connected to trans-impedance-amplifiers (not shown) mounted at the next stage in the optical node. For this composition, this optical node can function as a complete device.

The following is a description concerning the operation of the above optical node. When a light is first input to the lower waveguide 503, one branch of the light at a wavelength of $\lambda_1$=825 nm is conducted from the optical coupler 510 into the receiver 511 and is always detected therein. Another branch of the light at the wavelength $\lambda_{2i}$=835–840 nm is selected by the tunable type optical coupler 509 and is detected by the receiver 512. This optical coupler 509 is controlled by a reverse bias voltage and has a transmission bandwidth of 0.5 nm and is thus able to cover the wavelength-bandwidth of about ten channels.

Fifth Embodiment Of Optical Node

Figure 7:
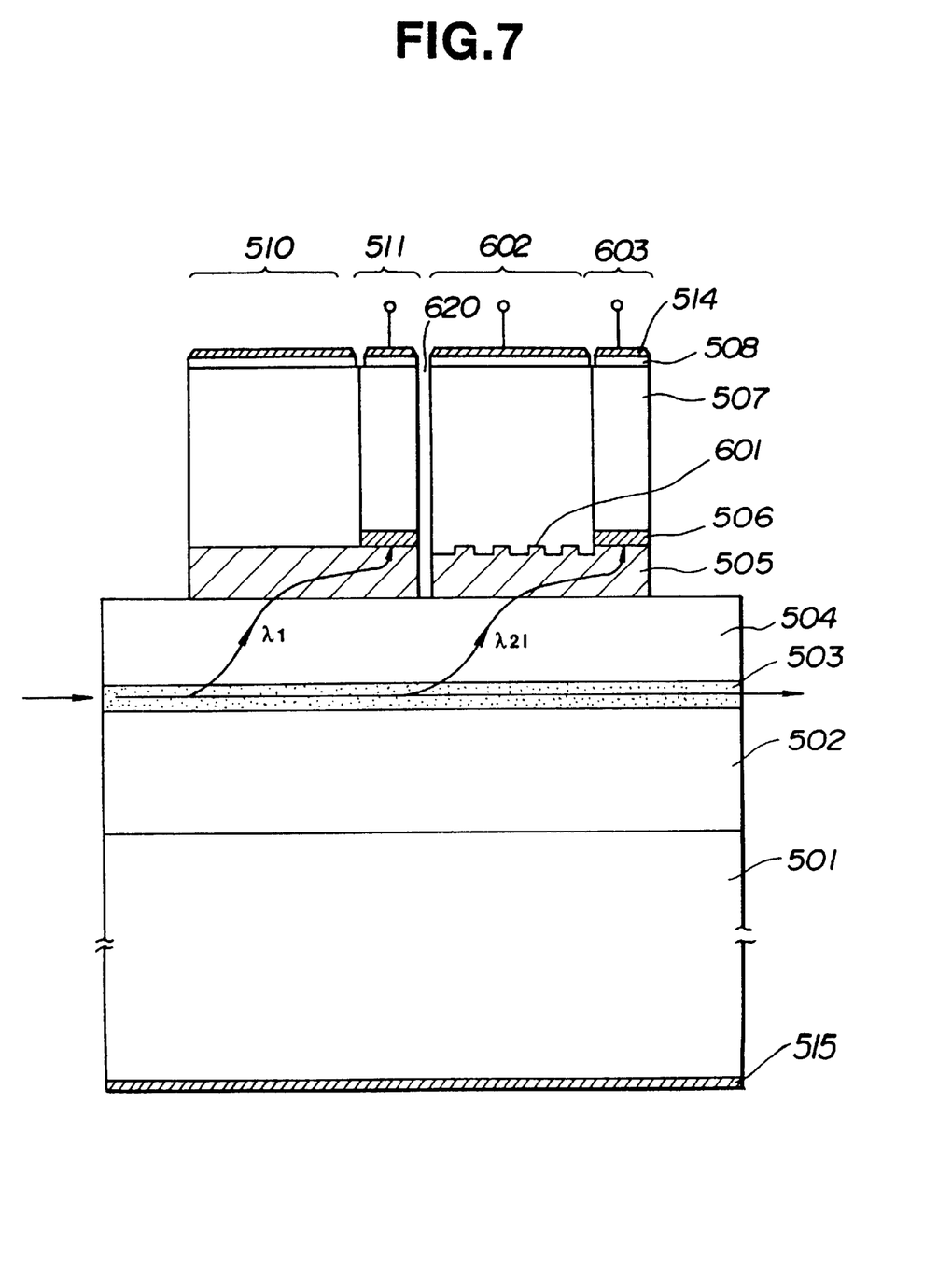
FIG. 7 is a cross-sectional view of a fifth embodiment of an optical node illustrative of the present invention.

Hereinafter, explained is the fifth embodiment of an optical node according to the present invention. This embodiment is the same as the fourth embodiment, except for the following description. The grating 513 of a backward direction coupling is adopted as the tunable optical coupler 509 in the fourth embodiment described above. In the fifth embodiment, however, a grating 601 is employed, which is of a forward direction coupling type.

Referring to FIG. 7, this figure illustrates a cross-section of an optical node of the fifth embodiment, which has the same multi-layer structure as the fourth embodiment of FIG. 6. Therefore, the following description deals with only the operation of this optical node. In this optical node, one branch of light traveling through the lower waveguide 503 is conducted in a forward direction by a tunable type optical coupler 602, and then the branch light (the wavelength at $\lambda_{2i}$) is input into a receiver 603 to be detected therein. Another branch light at the wavelength $\lambda_1$ is also conducted in a forward direction by the fixed-wavelength optical coupler 510 and then is input into the receiver 511 to be detected. Most of the input light of the wavelength $\lambda_1$ is absorbed by the receiver 511, but there is a possibility that the remainder of the branch light of the wavelength $\lambda_1$ could be input into the receiver 603.

In this case, it is necessary to form a vertical slit 620 between the receiver 11 and the tunable optical coupler 602 by etching, in order to prevent such input of the remainder into the receiver 603. Using the forward-direction coupling grating 601, a bandwidth of the coupling wavelength becomes wider to 2–3 nm as compared with the backward-direction coupling grating 513. As a result, the number of channels tuned to by this tunable optical coupler 602 decreases, but it is possible to maintain stables receiving and low crosstalk even if the wavelength of a transmitted light unstably fluctuates, due to the wide wavelength-distance between adjacent channels.

Sixth Embodiment Of Optical Node

Figure 8:
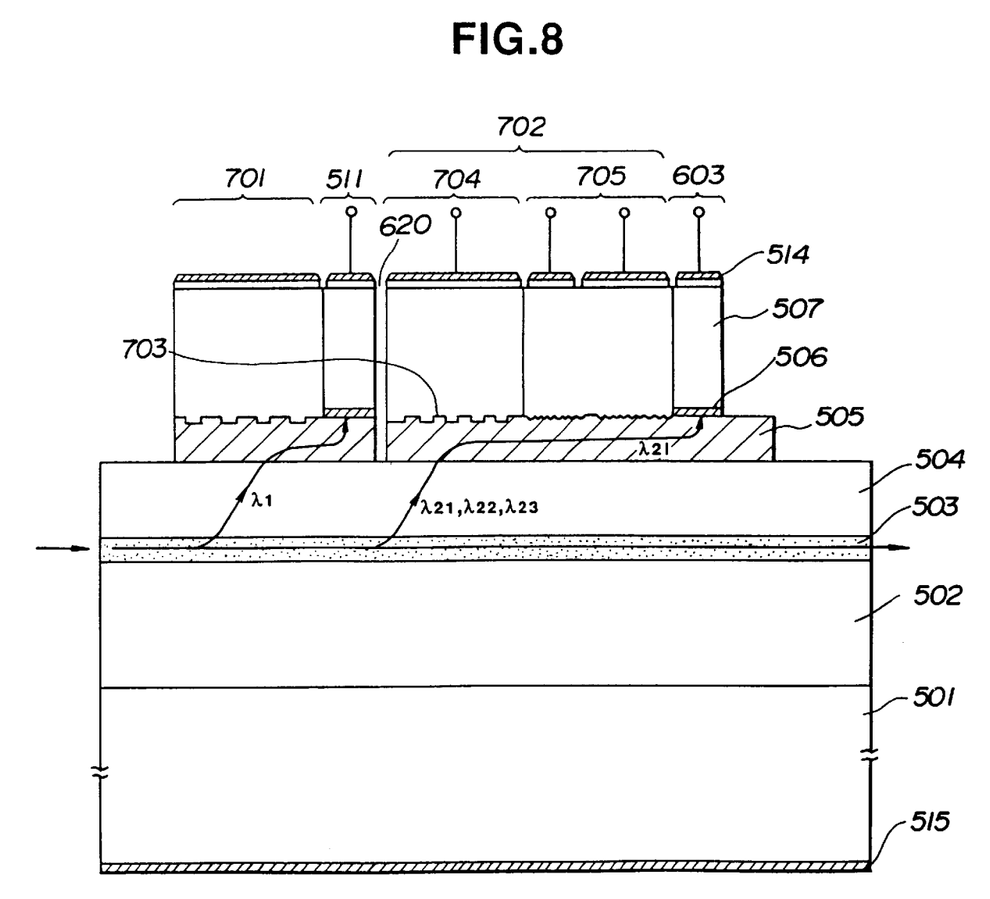
FIG. 8 is a cross-sectional view of a sixth embodiment of an optical node illustrative of the present invention.

Referring to FIG. 8, this sectional view illustrates the sixth embodiment of an optical node according to the present invention. This embodiment is similar to the fourth embodiment of FIG. 6, except for the following.

As shown in FIG. 8, this optical node has the same multi-layer structure as the fourth embodiment. However, since this optical node uses a forward-direction type grating coupler 701 having finer wavelength bandwidth selectivity than that of a usual asymmetrical directional coupler, it can reduce a wavelength-distance between the wavelength $\lambda_1$ of the access-control signal and the wavelength $\lambda_{2i}$ of the data signal.

A tunable type optical coupler 702 includes in combination, a fixed-wavelength type optical coupler 704 and a DFB (Distributed FeedBack) type or DBR (Distributed Bragg Reflector) type filter 705. The optical coupler 704 comprises a forward-direction type grating coupler 703, preset to select all of the multiplexed wavelengths $\lambda_{2i}$ for carrying the data signals. The filter 705 can select an arbitrary wavelength from among the multiplexed wavelengths $\lambda_{2i}$ and amplify this selected wavelength.

The tunable filter 705 has a bandwidth of 0.1 nm or less and is adopted as a device for tuning to one of the multiplexed wavelength $\lambda_{2i}$. Thus, this optical node can tune to a large number of channels, (e.g., 20 or more). In the case of $\lambda_1=830$ and $\lambda_{2i}=835$ nm–837 nm, this optical node can tune to 100 channels and over.

In the fourth to sixth embodiments, the receiver can be replaced by a laser for generating a light signal to obtain an optical node having a light transmitting function.

The preferred embodiments described herein are therefore illustrative and not restrictive, and the scope of the present invention being indicated by the claims and all variations which come within the meaning of the claims are intended to be embraced therein.

What is claimed is:

1. An integrated optical node comprising:
   a semiconductor substrate;
   a main waveguide formed on said substrate;
   at least one sub-waveguide formed on said substrate;
   a fixed-wavelength type optical coupler means for performing an optical coupling between said main waveguide and said sub-waveguide at a predetermined wavelength; and
   a tunable type optical coupler means for performing an optical coupling between said main waveguide and said sub-waveguide at a tuned wavelength,
   wherein a bandwidth of the coupled wavelength of said fixed-wavelength type optical coupler means is wider than that of the coupled wavelength of said tunable type optical coupler means.

2. An integrated optical node according to claim 1, further comprising an optical receiver for receiving a light guided from said main waveguide to said sub-waveguide by said fixed-wavelength type optical coupler means, said optical receiver being formed on said sub-waveguide.

3. An integrated optical node according to claim 1, further comprising an optical receiver for receiving a light guided from said main waveguide to said sub-waveguide by said tunable type optical coupler means, said optical receiver being formed on said sub-waveguide.

4. An integrated optical node according to claim 1, further comprising laser means for emitting a light to be guided from said sub-waveguide to said main waveguide by said fixed-wavelength type optical coupler means, said laser means being formed on said sub-waveguide.

5. An integrated optical node according to claim 1, further comprising tunable laser means for emitting a light of a tuned wavelength to be guided from said sub-waveguide to said main waveguide by said tunable type optical coupler means, said tunable laser means being formed on said sub-waveguide.

6. An integrated optical node according to claim 1, wherein said fixed-wavelength type optical coupler means comprises an asymmetrical directional coupler.

7. An integrated optical node according to claim 1, wherein said fixed-wavelength type optical coupler means comprises a directional grating coupler including a grating for phase-matching.

8. An integrated optical node according to claim 1, wherein said tunable type optical coupler means comprises a directional grating coupler including a grating for phase-matching.

9. An integrated optical node according to claim 1, wherein said tunable type optical coupler means comprises a distributed feedback type filter in which a wavelength for filtering light is tunable.

10. An integrated optical node according to claim 1, wherein said tunable type optical coupler means comprises a distributed Bragg reflector type filter in which a wavelength for filtering light is tunable.

11. An integrated optical node according to claim 1, wherein said fixed type optical coupler means performs the optical coupling in a forward direction between said main waveguide and said sub-waveguide and said tunable type optical coupler means performs the optical coupling in a backward direction between said main waveguide and said sub-waveguide.

12. An integrated optical node according to claim 1, wherein said fixed type optical coupler means performs the optical coupling in a forward direction between said main waveguide and said sub-waveguide and said tunable type optical coupler means performs the optical coupling in the forward direction between said main waveguide and said sub-waveguide.

13. An integrated optical node according to claim 1, wherein said main waveguide and said sub-waveguide are arranged horizontally in a plane.

14. An integrated optical node according to claim 1, wherein said main waveguide and said sub-waveguide are arranged vertically in different planes.

15. An integrated optical node according to claim 1, wherein said tunable type optical coupler means comprises a fixed-wavelength optical coupler and a tunable filter, said fixed-wavelength optical coupler and said tunable filter being serially arranged.

16. An integrated optical node according to claim 15, wherein said fixed-wavelength optical coupler comprises a directional grating coupler for performing the optical coupling in a forward direction between said main waveguide and said sub-waveguide and said tunable filter comprises a tunable filter for selecting a tuned wavelength from a light guided by said directional grating coupler and amplifies the tuned wavelength.

17. An integrated optical node according to claim 1, wherein said fixed-wavelength type optical coupler means comprises a directional coupler not including a grating for phase-matching and said tunable type optical coupler means comprises a directional grating coupler including a grating for phase-matching.

18. An optical communication network comprising:
   a light transmission line;
   a plurality of terminals; and
   a plurality of optical nodes for respectively connecting said corresponding terminals to said transmission line, at least one of said optical nodes including a semiconductor substrate, a main waveguide formed on said substrate, at least one sub-waveguide formed on said substrate, fixed-wavelength type optical coupler means for performing an optical coupling at a predetermined wavelength between said main waveguide and said sub-waveguide and a tunable type optical coupler means for performing an optical coupling at a tuned wavelength between said main waveguide and said sub-waveguide,
   wherein a bandwidth of the coupled wavelength of said fixed-wavelength type optical coupler means is wider than that of the coupled wavelength of said tunable type optical coupler means.

19. An optical communication network according to claim 18, wherein said optical node further includes an optical receiver for receiving a light guided from said main waveguide to said sub-waveguide by said fixed-wavelength type optical coupler means, said optical receiver being formed on said sub-waveguide.

20. An optical communication network according to claim 18, wherein said optical node further includes an optical receiver for receiving a light guided from said main waveguide to said sub-waveguide by said tunable type optical coupler means, said optical receiver being formed on said sub-waveguide.

21. An optical communication network according to claim 18, wherein said optical node further includes laser means for emitting a light to be guided from said sub-waveguide to said main waveguide by said fixed-wavelength type optical coupler means, said laser means being formed on said sub-waveguide.

22. An optical communication network according to claim 18, wherein said optical node further includes tunable laser means for emitting a light of a tuned wavelength to be guided from said sub-waveguide to said main waveguide by said tunable type optical coupler means, said tunable laser means being formed on said sub-waveguide.

23. An optical communication network according to claim 18, wherein said fixed-wavelength type optical coupler means comprises an asymmetrical directional coupler.

24. An optical communication network according to claim 18, wherein said fixed-wavelength type optical coupler means comprises a directional grating coupler including a grating for phase-matching.

25. An optical communication network according to claim 18, wherein said tunable type optical coupler means comprises a directional grating coupler including a grating for phase-matching.

26. An optical communication network according to claim 18, wherein said tunable type optical coupler-means comprises a distributed feedback type filter in which a wavelength for filtering light is tunable.

27. An optical communication network according to claim 18, wherein said tunable type optical coupler means comprises a distributed Bragg reflector type filter in which a wavelength for filtering light is tunable.

28. An optical communication network according to claim 18, wherein said fixed type optical coupler means performs the optical coupling in a forward direction between said main waveguide and said sub-waveguide and said tunable type optical coupler means performs the optical coupling in a backward direction between said rain waveguide and said sub-waveguide.

29. An optical communication network according to claim 18, wherein said fixed type optical coupler means performs the optical coupling in a forward direction between said main waveguide and said sub-waveguide and said tunable type optical coupler means performs the optical coupling in the forward direction between said main waveguide and said sub-waveguide.

30. An optical communication network according to claim 18, wherein said main waveguide and said sub-waveguide are arranged horizontally in a plane.

31. An optical communication network according to claim 18, wherein said main waveguide and said sub-waveguide are arranged vertically in different planes.

32. An optical communication network according to claim 18, wherein said tunable type optical coupler means comprises a fixed-wavelength optical coupler and a tunable filter, said fixed-wavelength optical coupler and said tunable filter being serially arranged.

33. An optical communication network according to claim 18, wherein said fixed-wavelength optical coupler means comprises a directional grating coupler for performing the optical coupling in a forward direction between said main waveguide and said sub-waveguide and said tunable type optical coupler means comprises a tunable filter for selecting a tuned wavelength from light guided by said directional grating coupler and amplifies the tuned wavelength.

34. An optical communication network according to claim 18, wherein said fixed wavelength type optical coupler means comprises a directional coupler not including a grating for phase-matching and said tunable type optical coupler means comprises a directional grating coupler including a grating for phase-matching.

35. An optical node to which a plurality of lights each having a different wavelength are input, comprising:
   a fixed wavelength type optical selecting means for selecting a predetermined wavelength light out of said plurality of lights, and
   a tunable type optical selecting means for performing and selecting a light having a tuned wavelength out of said plurality of lights,
   wherein a bandwidth of the selected wavelength of said fixed wavelength type optical selecting means is wider than that of the selected wavelength of said tunable type optical selecting means.

36. An optical node outputting a plurality of lights each having a different wavelength to a light transmission line, comprising:
   a waveguide for connecting an output light with said light transmission line;
   a first emitting means for outputting a predetermined wavelength light;

a first coupling means for coupling said predetermined wavelength light to said waveguide;

a second emitting means for outputting a light having a tuned wavelength; and a second coupling means for coupling said light having the tuned wavelength to said waveguide, wherein a bandwidth of a coupled wavelength of said first coupling means is wider than that of a coupled wavelength of said second coupling means.

37. An integrated optical node comprising:

a semiconductor substrate;

a main waveguide formed on said substrate;

at least one sub-waveguide formed on said substrate;

a fixed-wavelength type optical coupler means for performing an optical coupling between said main waveguide and said sub-waveguide at a predetermined wavelength; and a tunable type optical coupler means for performing an optical coupling between said main waveguide and said sub-waveguide at a tuned wavelength, wherein a signal having said tuned wavelength is transmitted through said tunable type optical coupler means dependent on a received signal having said predetermined wavelength.

38. An integrated optical node according to claim 37, further comprising an optical receiver for receiving the signal having said predetermined wavelength guided from said main waveguide to said sub-waveguide by said fixed-wavelength type optical coupler means, said optical receiver being formed on said sub-waveguide.

39. An integrated optical node according to claim 37, further comprising an optical receiver for receiving the signal having the tuned wavelength guided from said main waveguide to said sub-waveguide by said tunable type optical coupler means, said optical receiver being formed on said sub-waveguide.

40. An integrated optical node according to claim 37, further comprising laser means for emitting a signal to be guided from said sub-waveguide to said main waveguide by said fixed-wavelength type optical coupler means, said laser means being formed on said sub-waveguide.

41. An integrated optical node according to claim 37, further comprising tunable laser means for emitting a signal of a tuned wavelength to be guided from said sub-waveguide to said main waveguide by said tunable type optical coupler means, said tunable laser means being formed on said sub-waveguide.

42. An integrated optical node according to claim 37, wherein said fixed-wavelength type optical coupler means comprises an asymmetrical directional coupler.

43. An integrated optical node according to claim 37, wherein said fixed-wavelength type optical coupler means comprises a directional grating coupler including a grating for phase-matching.

44. An integrated optical node according to claim 37, wherein said tunable type optical coupler means comprises a directional grating coupler including a grating for phase-matching.

45. An integrated optical node according to claim 37, wherein said tunable type optical coupler means comprises a distributed feedback type filter in which a wavelength for filtering signals is tunable.

46. An integrated optical node according to claim 37, wherein said tunable type optical coupler means comprises a distributed Bragg reflector type filter in which a wavelength for filtering signals is tunable.

47. An integrated optical node according to claim 37, wherein said fixed type optical coupler means performs the optical coupling in a forward direction between said main waveguide and said sub-waveguide and said tunable type optical coupler means performs the optical coupling in a backward direction between said main waveguide and said sub-waveguide.

48. An integrated optical node according to claim 37, wherein said fixed type optical coupler means performs the optical coupling in a forward direction between said main waveguide and said sub-waveguide and said tunable type optical coupler means performs the optical coupling in the forward direction between said main waveguide and said sub-waveguide.

49. An integrated optical node according to claim 37, wherein said main waveguide and said sub-waveguide are arranged horizontally in a plane.

50. An integrated optical node according to claim 37, wherein said main waveguide and said sub-waveguide are arranged vertically in different planes.

51. An integrated optical node according to claim 37, wherein said tunable type optical coupler means comprises a fixed-wavelength optical coupler and a tunable filter, said fixed-wavelength optical coupler and said tunable filter being serially arranged.

52. An integrated optical node according to claim 51, wherein said fixed-wavelength optical coupler comprises a directional grating coupler for performing the optical coupling in a forward direction between said main waveguide and said sub-waveguide and said tunable filter comprises a tunable filter for selecting a tuned wavelength from a signal guided by said directional grating coupler and amplifies the tuned wavelength.

53. An integrated optical node according to claim 37, wherein said fixed-wavelength type optical coupler means comprises a directional coupler not including a grating for phase-matching and said tunable type optical coupler means comprises a directional grating coupler including a grating for phase-matching.

54. An optical communication network comprising:

a light transmission line;

a plurality of optical nodes; for respectively connecting corresponding terminals to said transmission line, at least one of said optical nodes including a semiconductor substrate, a main waveguide formed on said substrate, at least one sub-waveguide formed on said substrate, a fixed-wavelength type optical coupler means for performing an optical coupling between said main waveguide and said sub-waveguide at a predetermined wavelength, and a tunable type optical coupler means for performing an optical coupling between said main waveguide and said sub-waveguide at a tuned wavelength, wherein a signal having said tuned wavelength is transmitted through said tunable type optical coupler means dependent on a received signal having said predetermined wavelength.

55. An optical communication network according to claim 54, wherein said optical node further includes an optical receiver for receiving the signal guided from said main waveguide to said sub-waveguide by said fixed-wavelength type optical coupler means, said optical receiver being formed on said sub-waveguide.

56. An optical communication network according to claim 54, wherein said optical node further includes an optical receiver for receiving the signal guided from said main waveguide to said sub-waveguide by said tunable type optical coupler means, said optical receiver being formed on said sub-waveguide.

57. An optical communication network according to claim 54, wherein said optical node further includes laser means for emitting a signal to be guided from said sub-waveguide to said main waveguide by said fixed-wavelength type optical coupler means, said laser means being formed on said sub-waveguide.

58. An optical communication network according to claim 54, wherein said optical node further includes tunable laser means for emitting a signal of a tuned wavelength to be guided from said sub-waveguide to said main waveguide by said tunable type optical coupler means, said tunable laser means being formed on said sub-waveguide.

59. An optical communication network according to claim 54, wherein said fixed-wavelength type optical coupler means comprises an asymmetrical directional coupler.

60. An optical communication network according to claim 54, wherein said fixed-wavelength type optical coupler means comprises a directional grating coupler including a grating for phase-matching.

61. An optical communication network according to claim 54, wherein said tunable type optical coupler means comprises a directional grating coupler including a grating for phase-matching.

62. An optical communication network according to claim 54, wherein said tunable type optical coupler means comprises a distributed feedback type filter in which a wavelength for filtering signals is tunable.

63. An optical communication network according to claim 54, wherein said tunable type optical coupler means comprises a distributed Bragg reflector type filter in which a wavelength for filtering signals is tunable.

64. An optical communication network according to claim 54, wherein said fixed type optical coupler means performs the optical coupling in a forward direction between said main waveguide and said sub-waveguide and said tunable type optical coupler means performs the optical coupling in a backward direction between said main waveguide and said sub-waveguide.

65. An optical communication network according to claim 54, wherein said fixed type optical coupler means performs the optical coupling in a forward direction between said main waveguide and said sub-waveguide and said tunable type optical coupler means performs the optical coupling in the forward direction between said main waveguide and said sub-waveguide.

66. An optical communication network according to claim 54, wherein said main waveguide and said sub-waveguide are arranged horizontally in a plane.

67. An optical communication network according to claim 54, wherein said main waveguide and said sub-waveguide are arranged vertically in different planes.

68. An optical communication network according to claim 54, wherein said tunable type optical coupler means comprises a fixed-wavelength optical coupler and a tunable filter, said fixed-wavelength optical coupler and said tunable filter being serially arranged.

69. An optical communication network according to claim 54, wherein said fixed-wavelength optical coupler means comprises a directional grating coupler for performing the optical coupling in a forward direction between said main waveguide and said sub-waveguide and said tunable filter, comprises a tunable filter for selecting a tuned wavelength from signals guided by said grating coupler and amplifies wavelength.

70. An optical communication network according to claim 54, wherein said fixed wavelength type optical coupler means comprises a directional coupler not including a grating for phase-matching and said tunable type optical coupler means comprises a directional grating coupler including a grating for phase-matching.

* * * * *

UNITED STATES PATENT AND TRADEMARK OFFICE
CERTIFICATE OF CORRECTION

PATENT NO. : 6,072,925

DATED : June 6, 2000

INVENTOR(S): HAJIME SAKATA

Page 1 of 2

It is certified that error appears in the above-identified patent and that said Letters Patent is hereby corrected as shown below:

COLUMN 2:
Line 50, "drawing:" should read --drawings:--.

COLUMN 3:
Line 7, "EMBODIMENT" should read --EMBODIMENTS--;
Line 31, "(differ" should read --differ--;
Line 54, "$2\pi\Lambda$" should read --$2\pi/\Lambda$--; and
Line 56, "a" should read --an--.

COLUMN 6:
Line 5, "following" should read --the following--.

COLUMN 7:
Line 6, "receiver 11" should read --receiver 511--;
Line 13, "stables" should read --stable--; and
Line 41, "wavelength $\lambda 2_i$" should read --wavelengths $\lambda 2_i$--.

UNITED STATES PATENT AND TRADEMARK OFFICE
CERTIFICATE OF CORRECTION

PATENT NO. : 6,072,925

DATED : June 6, 2000

INVENTOR(S): HAJIME SAKATA

Page 2 of 2

It is certified that error appears in the above-identified patent and that said Letters Patent is hereby corrected as shown below:

COLUMN 10:
Line 2, "coupler-means" should read --coupler means--;
Line 14, "rain" should read --main--; and
Line 35, "fixed-wavelength" should read --fixed-wavelength type--.

COLUMN 12:
Line 41, "nodes;" should read --nodes--.

Signed and Sealed this

Seventeenth Day of April, 2001

Attest:

NICHOLAS P. GODICI

Attesting Officer

Acting Director of the United States Patent and Trademark Office